(12) United States Patent
Hinrich

(10) Patent No.: US 9,636,994 B2
(45) Date of Patent: May 2, 2017

(54) COOLING DEVICE FOR A HYBRID MODULE OF A HYBRID VEHICLE

(71) Applicant: Dr. Ing. h.c. F. Porsche Aktiengesellschaft, Stuttgart (DE)

(72) Inventor: Holger Hinrich, Leonberg (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 241 days.

(21) Appl. No.: 14/608,411

(22) Filed: Jan. 29, 2015

(65) Prior Publication Data

US 2015/0210155 A1 Jul. 30, 2015

(30) Foreign Application Priority Data

Jan. 29, 2014 (DE) ........................ 10 2014 101 035

(51) Int. Cl.
| | | |
|---|---|---|
| *B60K 11/00* | (2006.01) | |
| *B60K 1/00* | (2006.01) | |
| *F16H 61/28* | (2006.01) | |
| *F16H 57/04* | (2010.01) | |
| *H02K 17/32* | (2006.01) | |

(Continued)

(52) U.S. Cl.
CPC ............... *B60K 11/00* (2013.01); *B60K 1/00* (2013.01); *F16H 57/04* (2013.01); *F16H 57/0415* (2013.01); *F16H 57/0419* (2013.01); *F16H 61/2807* (2013.01); *H02K 9/22* (2013.01); *H02K 17/32* (2013.01); *F01P 2050/24* (2013.01);

(Continued)

(58) Field of Classification Search
CPC .......... B60K 11/00; B60K 11/06; B60K 6/22; B60K 6/405; B60K 23/02; F16H 57/04; F16H 57/045; F16H 57/0415; F16H 57/0419; F16H 61/2807; H02K 17/32; H05K 7/20; F01P 2050/24

USPC .......................................... 165/185; 361/704
See application file for complete search history.

(56) References Cited

U.S. PATENT DOCUMENTS 5,361,650 A * 11/1994 Klecker .............. F16H 61/0006
174/521
5,709,134 A * 1/1998 Ulm .................... B60R 16/0239
174/521

(Continued)

FOREIGN PATENT DOCUMENTS

| EP | 2594445 A2 | 5/2013 |
|---|---|---|
| JP | 2000507338 A | 6/2000 |
| JP | 2013126864 A | 6/2013 |

*Primary Examiner* — Tho V Duong
(74) *Attorney, Agent, or Firm* — Gerald E. Hespos; Michael J. Porco; Matthew T. Hespos

(57) ABSTRACT

A cooling device (2) is provided for a hybrid module (1) of a hybrid vehicle. The hybrid module (1) has an actuator arranged between an internal combustion engine and an electric drive unit of the hybrid vehicle for actuating a separating clutch for separating the internal combustion engine and the electric drive unit. The hybrid module (1) also has control electronics (7). The actuator and the control electronics (7) are arranged within a heat protection hood (9) and at least the control electronics (7) are connected to the heat protection hood (9). The heat protection hood (9) is composed of heat-conducting material and is connected to a housing part (5) of the hybrid module (1). The cooling device enables use of the hybrid module in the region of hot components, such as the internal combustion engine or an exhaust system.

14 Claims, 1 Drawing Sheet

(51) Int. Cl.
  *H02K 9/22*    (2006.01)
  *H02K 7/00*    (2006.01)
  *H02K 9/20*    (2006.01)
  *H02K 11/33*   (2016.01)

(52) U.S. Cl.
  CPC .............. *H02K 7/006* (2013.01); *H02K 9/20* (2013.01); *H02K 11/33* (2016.01)

(56) References Cited

U.S. PATENT DOCUMENTS

| | | | |
|---|---|---|---|
| 5,940,279 A * | 8/1999 | Gademann | H01L 23/045 174/152 GM |
| 6,148,855 A | 11/2000 | Rauner et al. | |
| 6,943,293 B1 | 9/2005 | Jeter et al. | |
| 7,147,094 B2 * | 12/2006 | Wakao | B60K 17/35 180/249 |
| 7,643,297 B2 * | 1/2010 | Tominaga | B62D 5/0406 165/80.2 |
| 8,451,611 B2 * | 5/2013 | Nakagami | F04B 39/06 165/104.33 |
| 8,792,242 B2 * | 7/2014 | Wetzel | H05K 5/0082 361/707 |
| 2001/0015887 A1 * | 8/2001 | Sanada | H05K 1/144 361/704 |
| 2005/0064989 A1 | 3/2005 | Wakao et al. | |
| 2006/0181166 A1 | 8/2006 | Saito et al. | |
| 2009/0078489 A1 | 3/2009 | Feier et al. | |
| 2011/0182034 A1 | 7/2011 | Garcia et al. | |
| 2011/0294620 A1 * | 12/2011 | Pruitt | B60K 6/48 477/5 |
| 2012/0031215 A1 | 2/2012 | Feier | |

* cited by examiner

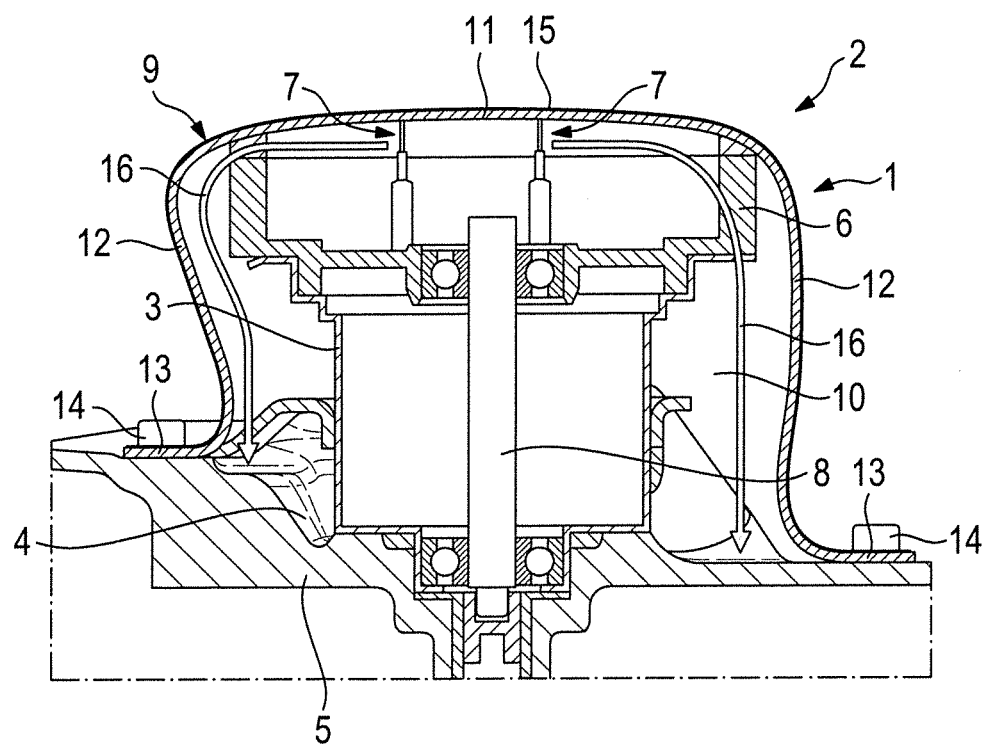

COOLING DEVICE FOR A HYBRID MODULE OF A HYBRID VEHICLE

CROSS REFERENCE TO RELATED APPLICATION

This application claims priority under 35 USC 119 to German Patent Appl. No. 10 2014 101 035.3 filed on Jan. 29, 2014, the entire disclosure of which is incorporated herein by reference.

BACKGROUND

1. Field of the Invention

The invention relates to a cooling device for a hybrid module of a hybrid vehicle. The hybrid module has an actuator arranged between an internal combustion engine and an electric drive unit of the hybrid vehicle for operating a separating clutch to separating internal combustion engine and electric drive unit.

2. Description of the Related Art

A hybrid module of a known hybrid vehicle has a cooling device with a heat sink that can dissipate heat from the hybrid module. The hybrid module has a separating clutch that is actuated via an external actuator. The actuator has electric components, such as control electronics, that must be cooled for best operation. In most applications, the actuator is in a hot environment, such as in a region exposed to the heat of the internal combustion engine or the heat of an exhaust system. Thus, effective cooling is difficult. Inadequate cooling leads to deactivation of the separating function and even to destruction of temperature-critical components in the actuator and the control electronics.

U.S. 2011/0182034 A1 discloses a covering composed of a composite material for a section of a motor vehicle transmission. The covering has a single-part, internal heat sink to which control electronics are fastened. The covering is produced from a thermally stable material, and is configured to close and protect a section of the motor vehicle transmission that has electric and electronic components, such as valves, solenoids, motors and sensors. A plate or heat sink is located at a distance from the inner surface of the covering and at the point where the covering is exposed on both sides to the flow of transmission fluid. The control electronics are arranged on the outer side of the covering and are fastened to the plate within the covering by heat-transmitting, mechanical fastening elements, such as pins or bolts. The housing of the control electronics is provided with a heat sink that has ribs. The described device is not suitable for operation in the region of hot components of a motor vehicle, such as in the region of an internal combustion engine or an exhaust system.

U.S. 2012/0031215 A1, U.S. 2009/0078489 A1 and U.S. Pat. No. 6,148,855 disclose cooling devices for assemblies of a motor vehicle that have control electronics. These cooling devices have cooling ribs that are exposed to external, cooler air.

It is an object of the invention to provide a cooling device for a hybrid module of a hybrid vehicle enabling use of the hybrid module in the region of hot components, such as the internal combustion engine or the exhaust system of the hybrid vehicle.

SUMMARY OF THE INVENTION

The invention relates to an actuator with control electronics arranged within a heat protection hood and with the control electronics connected to the heat protection hood. The actuator also may be connected to the heat protection hood. The heat protection hood is made of a heat-conducting material and is connected to a housing part of the hybrid module so that the housing part forms a heat sink. The heat protection hood protects the actuator and the control electronics from heat from the outside, for example heat from hot components located in the immediate vicinity, such as the internal combustion engine or exhaust system. Heat generated by the hot external components or by the actuator and/or the control electronics can be introduced over a short path through the heat conducting material of the heat protection hood and into the housing part of the hybrid module. Thus, the housing part forms a heat sink.

The housing part may be part of the actuator, and thus the heat sink may directly constitute a specific structural element of the actuator.

The heat protection hood is configured for sufficiently removing the heat arising in the region of the hybrid module into the housing part of the hybrid module so that the electric components of the hybrid module are not damaged by the heat. From thermal aspects, the housing part and the heat protection hood may form a closed space for the actuator and the control electronics. The closed space prevents warm air in the region of the hot components, such as the internal combustion engine or exhaust system, from being able to pass directly to the actuator and the control electronics. The heat protection hood may be composed of aluminum or copper to ensure a particularly good conduction of heat within the heat protection hood. The heat protection hood also may be formed by heat pipes or may have heat pipes.

Excessive heating of the heat protection hood desirably is prevented. A heat protection hood that remains relatively cool in the region of the hot components results in a smaller amount of heat that has to be removed through the heat protection hood to the housing part of the hybrid module, with the housing part forming the heat sink. Accordingly, it is particularly advantageous if the heat protection hood has an outer surface with low heat transmission of the medium surrounding the heat protection hood on the outside into the heat protection hood.

In particular, the heat protection hood may have an outer surface that is free of ribs. Ribs would increase the outer surface area of the heat protection hood, with the consequence of a relatively large admission of heat into the heat protection hood. However, the absence of ribs on the outer surface of the heat protection hood produces a relatively small admission of heat into the heat protection hood in otherwise identical thermal conditions.

The outer surface of the heat protection hood may be substantially free from elevations and depressions. This design keeps the area of the outer surface of the heat protection hood as small as possible.

The heat protection hood may have an outer surface layer made from a heat insulation material. The insulating layer ensures that the heat protection hood heats up only to a relatively small extent despite being arranged in the region of hot components of the hybrid vehicle.

The region of the heat protection hood that bears against the housing part may have an encircling flange to ensure good heat transfer from the heat protection hood to the region housing part of the hybrid vehicle that forms the heat sink. The large transition area between flange and housing part permits a large transfer of heat between heat protection hood and housing part and therefore a good reduction of the temperature of that region of the heat protection hood that faces the hot components.

The heat protection hood can be connected to the housing in different ways. For example, the region of the flange may be screwed to the housing part.

Further features of the invention emerge from the claims, the attached drawing and the description of the preferred exemplary embodiment that is reproduced in the drawing, without being restricted thereto.

BRIEF DESCRIPTION OF THE DRAWING

FIG. 1 shows a section through a hybrid module of a hybrid vehicle in the region of a cooling device for the hybrid module.

DETAILED DESCRIPTION

FIG. 1 shows a hybrid module 1 for use in a hybrid vehicle and to which a cooling device 2 is assigned. Only parts of the hybrid module 1 are shown in FIG. 1. The hybrid module 1 has an actuator arranged between an internal combustion engine and an electric drive unit of the hybrid vehicle. The actuator functions to actuate a separating clutch for separating the internal combustion engine and the electric drive unit. The actuator itself is not shown, but a housing 3 of the hybrid module 1 for receiving the actuator is illustrated. The housing 3 is mounted in a recess 4 of a housing part 5 of the hybrid module 1. The housing part 5 is made of material that readily conducts heat and is cooled via a cooling circuit (not shown), and therefore constitutes a heat sink.

A structural unit with the housing 3 forms a further housing 6 that receives control electronics 7 of the hybrid module 1. Only the electric connections of the control electronics 7 are shown. A shaft 8 is mounted in the two housings 3 and 6 interacts with the control electronics 7, so that the control electronics 7 sense the rotational position of the shaft 8.

The housing 3 therefore functions to receive the actuator, and the housing 6, that forms a structural unit with the housing 3, functions to receive the control electronics 7. The two electric components—the actuator and control electronics—produce heat during operation.

The actuator, the control electronics, and therefore the two housings 3 and 6, are arranged within a heat protection hood 9.

At least the control electronics 7 are connected in a heat-conducting manner to the heat protection hood 9. According to the exemplary embodiment, the actuator also is connected in a heat-transmitting manner to the heat protection hood 9. The heat protection hood 9 is made of aluminum or copper and therefore conducts heat readily. The housing part 5 of the hybrid module 1 and the heat protection hood 9 form a closed space 10 for the housing 3 and the housing 6 and therefore for the actuator and the control electronics 7. The space 10 in the region of the housing 3 is represented as an annular space.

The heat protection hood 9 is formed by a deep-drawn aluminum sheet, and therefore the heat protection hood 9 has a base 11, an encircling sidewall 12 and an encircling flange 13 adjoining the sidewall 12. Screws 14 pass through holes in the flange 13 to achieve a screw connection of heat protection hood 9 and housing part 5.

The heat protection hood 9 and therefore the actuator and the control electronics 7 are arranged outside the housing part 5 and are arranged in the immediate vicinity of hot components, such as an internal combustion engine or an exhaust system of the hybrid vehicle. Accordingly, this region of the hybrid module is exposed to an increased action of heat.

The heat protection hood 9 functions to protect the components that it encloses from heat. To reduce an admission of heat from the outside into the heat protection hood 9, the heat protection hood 9 is designed with a smooth outer surface, and therefore does not have any ribs or other arrangements of elevations and depressions. This results in a minimal surface of the heat protection hood 9 that faces the external heat source. In addition, the heat protection hood 9 is provided on the outside, and therefore in the region of the outer surface, with a layer 15 made from a heat insulation material. The layer 15 therefore covers the entire outer area of the heat protection hood 9.

Accordingly, a thermal connection is provided between the temperature-critical components of the actuator and the (relatively) cool housing part 5 in the region of the actuator. The connection formed by the heat protection hood 9 shields the actuator and the control electronics 7 from the hot surroundings, and also readily dissipates heat from the critical components into the housing part 5, in accordance with the illustrations of the arrows 16. For this purpose, the connection is manufactured from material that is readily capable of conducting heat, such as aluminum or copper, and is optionally additionally thermally insulated toward the hot surroundings, as above by the layer 15.

The design prevents electric components of the hybrid module that are located in the immediate vicinity of hot components from heating up too much and therefore being damaged.

What is claimed is:

1. A cooling device for a hybrid module of a hybrid vehicle, the hybrid module having an actuator arranged between an internal combustion engine and an electric drive unit of the hybrid vehicle for actuating a separating clutch for separating the internal combustion engine and the electric drive unit, the hybrid module further having control electronics, the cooling device comprising: a heat protection hood at least partly enclosing the actuator and the control electronics with at least the control electronics being connected to the heat protection hood, the heat protection hood being made of a heat-conducting material and being connected to a housing part of the hybrid module so that the housing part forms a heat sink.

2. The cooling device of claim 1, wherein the actuator is connected to the heat protection hood.

3. The cooling device of claim 2, wherein the housing part is part of a housing of the actuator.

4. The cooling device of claim 1, wherein the housing part and the heat protection hood form a closed space for the actuator and the control electronics.

5. The cooling device of claim 1, wherein the heat protection hood is made of aluminum or copper.

6. The cooling device of claim 1, wherein the heat protection hood has an outer surface configured for low heat transmission of a medium surrounding an outside of the heat protection hood into the heat protection hood.

7. The cooling device of claim 6, wherein the heat protection hood has an outer surface that is free of ribs.

8. The cooling device of claim 6, wherein the heat protection hood has an outer surface that does not have any elevations and depressions.

9. The cooling device of claim 6, wherein the heat protection hood has an outer surface with a layer made from a heat insulation material.

10. The cooling device of claim 1, wherein the heat protection hood has an encircling flange that bears against the housing part.

11. The cooling device of claim 10, wherein the flange of the heat protection hood is connected to the housing part by screws.

12. A cooling device for a hybrid module of a hybrid vehicle, the hybrid module having a first housing with a rotating shaft and a second housing with control electronics configured for sensing a rotational position of the rotating shaft, the cooling device comprising: a heat protection hood at least partly enclosing the first and second housings and the control electronics with at least the control electronics being connected to the heat protection hood, the heat protection hood being made at least partly of a heat-conducting metal and having an outer surface free of elevations and depressions, the heat protection hood further having an encircling flange extending transverse to the shaft, the encircling flange bearing against and connected to a housing part of the hybrid module so that the housing part forms a heat sink.

13. A cooling device for a hybrid module of a hybrid vehicle, the hybrid module having control electronics, the cooling device comprising: a heat protection hood at least partly enclosing the control electronics with at least the control electronics being connected to the heat protection hood, the heat protection hood being made at least partly of a heat-conducting metal and having an outer surface free of elevations and depressions, the heat protection hood further having an encircling flange that bears against and is connected to a housing part of the hybrid module so that the housing part forms a heat sink, and a layer of a heat insulation material on the outer surface of the heat protection hood.

14. The cooling device of claim 13, wherein the housing part and the heat protection hood form a closed space for the actuator and the control electronics.

* * * * *